US008208533B2

(12) United States Patent
Yang (10) Patent No.: US 8,208,533 B2
(45) Date of Patent: Jun. 26, 2012

(54) METHODS AND APPARATUS FOR FAST SIGNAL ACQUISITION IN A DIGITAL VIDEO RECEIVER

(75) Inventor: Shun-An Yang, Baoshan Township, Hsinchu County (TW)

(73) Assignee: MediaTek Inc. (TW)

( * ) Notice: Subject to any disclaimer, the term of this patent is extended or adjusted under 35 U.S.C. 154(b) by 872 days.

(21) Appl. No.: 12/252,749

(22) Filed: Oct. 16, 2008

(65) Prior Publication Data

US 2009/0129477 A1  May 21, 2009

Related U.S. Application Data

(60) Provisional application No. 60/988,108, filed on Nov. 15, 2007.

(51) Int. Cl.
*H04N 11/02* (2006.01)

(52) U.S. Cl. .............................. 375/240.01; 375/240.24

(58) Field of Classification Search .......... 375/241–243, 375/240.24–240.28
See application file for complete search history.

(56) References Cited

U.S. PATENT DOCUMENTS

| 5,805,302 | A * | 9/1998 | Enari et al. | ............... | 358/426.12 |
| 6,526,098 | B1 * | 2/2003 | Kato et al. | ............... | 375/240.24 |
| 2003/0142764 | A1 | 7/2003 | Keevill et al. | | |
| 2003/0156654 | A1 | 8/2003 | Blat | | |

FOREIGN PATENT DOCUMENTS

EP  1503557 A2  2/2005

OTHER PUBLICATIONS

European Standard; "Digital Video Broadcasting (DVB); Framing Structure, Channel Coding and Modulation for Digital Terrestrial Television"; Dated: Jun. 2004; pp. 1-2 and 29-34; Final Draft ETSI EN 300 744; vol. 1.5.1; European Telecommunications Standards Institute and European Broadcasting Union; France.

* cited by examiner

*Primary Examiner* — Hosuk Song
(74) *Attorney, Agent, or Firm* — The Law Offices of Andrew D. Fortney; Andrew D. Fortney; Anthony R. Jimenez (57) ABSTRACT

Methods and systems for receiving, processing and/or decoding digital video signal and acquisition of transmission parameters encoded therein. The method generally includes providing an initial set of parameters for decoding the digital video signal, finding a synchronization block position by matching bits of the transmission parameter signal to a predetermined pattern, obtaining raw transmission parameter bits from the transmission parameter signal based on the synchronization block position, storing the raw transmission parameter bits, and updating at least one of the initial set of parameters with at least one updated transmission parameter value from the raw transmission parameter bits. Embodiments of present invention advantageously provide a faster approach for synchronizing with the frame boundaries of transmission parameter blocks to decode digital video signals.

26 Claims, 6 Drawing Sheets

| 2K mode | 8K mode |
|---|---|
| 34 50 209 346 413 569 595 688 790 901 1073 1219 1262 1286 1469 1594 1687 | 34 50 209 346 413 569 595 688 790 901 1073 1219 1262 1286 1469 1594 1687 1738 1754 1913 2050 2117 2273 2299 2392 2494 2605 2777 2923 2966 2990 3173 3298 3391 3442 3458 3617 3754 3821 3977 4003 4096 4198 4309 4481 4627 4670 4694 4877 5002 5095 5146 5162 5321 5458 5525 5681 5707 5800 5902 6013 6185 6331 6374 6398 6581 6706 6799 |

METHODS AND APPARATUS FOR FAST SIGNAL ACQUISITION IN A DIGITAL VIDEO RECEIVER

RELATED APPLICATIONS

This application claims the benefit of U.S. Provisional Application No. 60/988,108, filed Nov. 15, 2007, the contents of which are incorporated herein by reference.

FIELD OF THE INVENTION

The present invention generally relates to the field of digital video processing. More specifically, embodiments of the present invention pertain to methods, algorithms, architectures, circuits, and/or systems of processing a digital video signal for rapid recovery of transmission parameters encoded therein.

BACKGROUND

In a digital video broadcasting (DVB) system, the value of certain transmission parameters must be known in order to correctly demodulate and decode a transport stream (e.g., an MPEG-2 or other digitally encoded video and/or audio transport stream) from a terrestrial broadcast carrier. In some systems, parameters may be encoded in the broadcast carrier, so that a conventional receiver must begin demodulating and decoding a carrier signal before the transport stream can be recovered. Two such systems are the Digital Video Broadcasting-Terrestrial (DVB-T) and Digital Video Broadcasting-Handheld (DVB-H) standards proposed by the European Telecommunications Standards Institute (ETSI), defining baseline transmission systems for digital television broadcasting.

Figure 1:
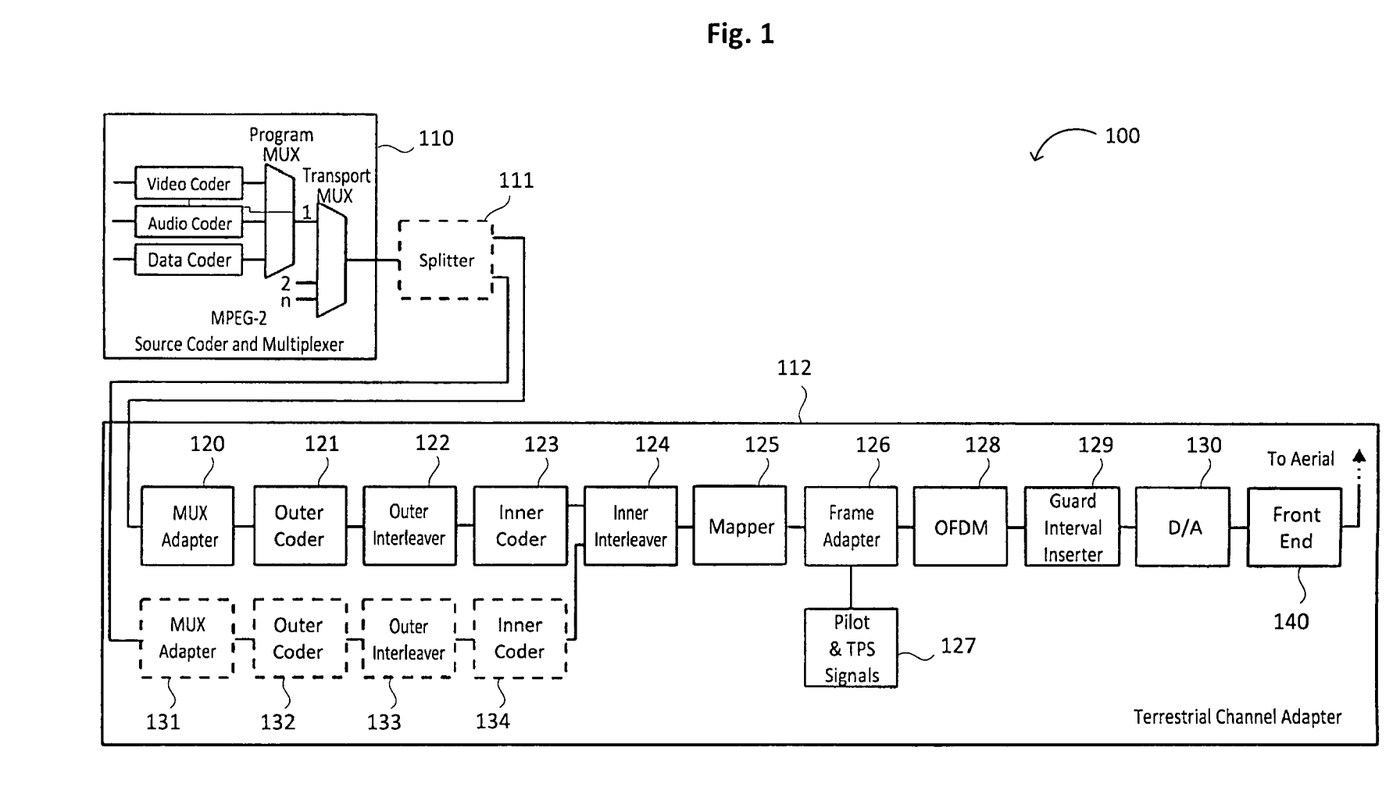
FIG. 1 is a functional block diagram of an exemplary conventional DVB encoding and modulation system.

Referring now to FIG. 1, a functional block diagram of an exemplary conventional DVB encoding and modulation system 100 according to the ETSI DVB-T/H standards is shown. The output of an MPEG-2 transport multiplexer 110 is generally encoded and modulated onto a broadcast carrier by DVB system 112. DVB system 112 may process the transport stream through transport multiplex adaptation and randomization (e.g., for energy dispersal) module 120, outer coder (e.g., using a Reed-Solomon code) 121, outer interleaver (e.g., using convolutional interleaving) 122, inner coder (e.g., using a punctured convolutional code) 123, inner interleaver 124, mapper 125, frame adaptation module 126, Orthogonal Frequency Division Multiplexer (OFDM) 128, guard interval inserter 129, and digital-to-analog converter (DAC) 130. Transmission parameters may be inserted by the frame adaptation module in response to transmission parameter signaling (TPS) module 127.

A variety of transmission parameters may affect the encoding and modulation (and thereby affect the subsequent demodulation and decoding) of the transport stream. For example, two modes of operation are defined: a "2K mode" and an "8K mode." The "2K mode" is suitable for single transmitter operation and for small single frequency networks with limited transmitter distances. The "8K mode" can be used for single transmitter operation and for both small and large single frequency networks.

The transmission parameters may also specify a modulation type. The system supports quadrature phase-shift keying (QPSK) and different levels of quadrature amplitude modulation (QAM) and different inner code rates to be used to trade bit rate versus ruggedness. The system also supports two level hierarchical channel coding and modulation, including uniform and multiresolution constellation. Data carriers in one OFDM frame are generally modulated using QPSK, 16-QAM, 64-QAM, non-uniform 16-QAM, or non-uniform 64-QAM constellations. The proportions of the constellations generally depend on a transmission parameter $\alpha$, which can take the three values 1, 2, or 4, where $\alpha$ is the minimum distance separating two constellation points carrying different high priority (HP) bit values divided by the minimum distance separating any two constellation points.

In the multi-resolution case, referring again to FIG. 1, splitter 111 may separate the incoming transport stream into two independent MPEG transport streams, referred to as the high-priority and the low-priority stream. These two bitstreams may be mapped onto the signal constellation by the mapper 125 and/or modulator 128.

The inner coder 123 may encode the data using a range of punctured convolutional codes, based on a mother convolutional code of rate 1/2 with 64 states, generally allowing selection of the most appropriate level of error correction for a given service or data rate in either non-hierarchical or hierarchical transmission mode. In addition to the mother code of rate 1/2 the system supports punctured code rates of 2/3, 3/4, 5/6 and 7/8. If two level hierarchical transmission is used, each of the two parallel channel encoders 123 and 134 may have its own independent code rate. The code rate used is generally encoded as a transmission parameter.

Figure 2:
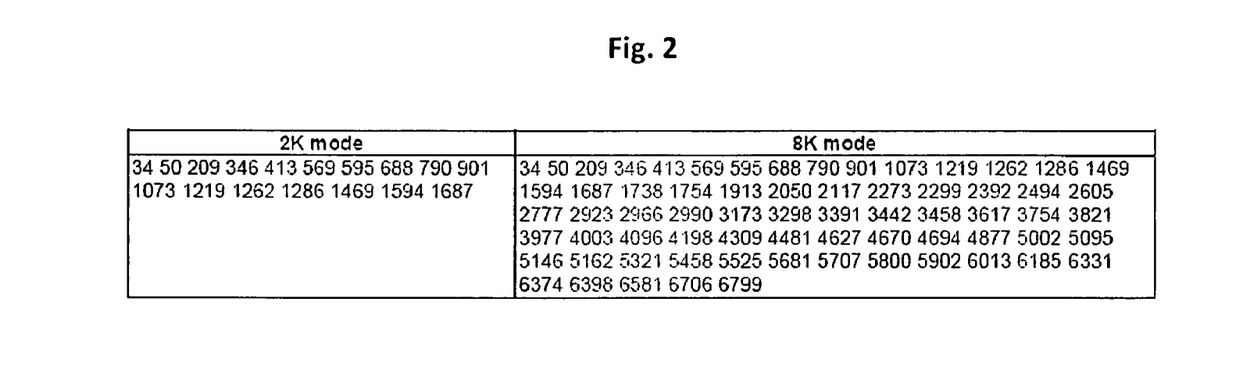
FIG. 2 is a table of carrier indices for transmission parameter signaling (TPS) carriers in an OFDM symbol.

In the ETSI DVB-T/H standards, TPS carriers are used for the purpose of signaling parameters related to the transmission scheme (e.g., channel coding, modulation, etc.). The TPS is transmitted in parallel on 17 TPS carriers for the 2K mode and on 68 carriers for the 8K mode. Every TPS carrier in the same symbol conveys the same differentially encoded information bit. Referring now to FIG. 2, the carrier indices for TPS carriers in an OFDM symbol (e.g., a symbol comprising 6,817 carriers in the 8K mode or a symbol comprising 1,705 carriers in the 2K mode) are shown. In addition to the TPS carriers, an OFDM frame generally contains transmitted data and scattered pilot cells and continual pilot carriers.

Figure 3:
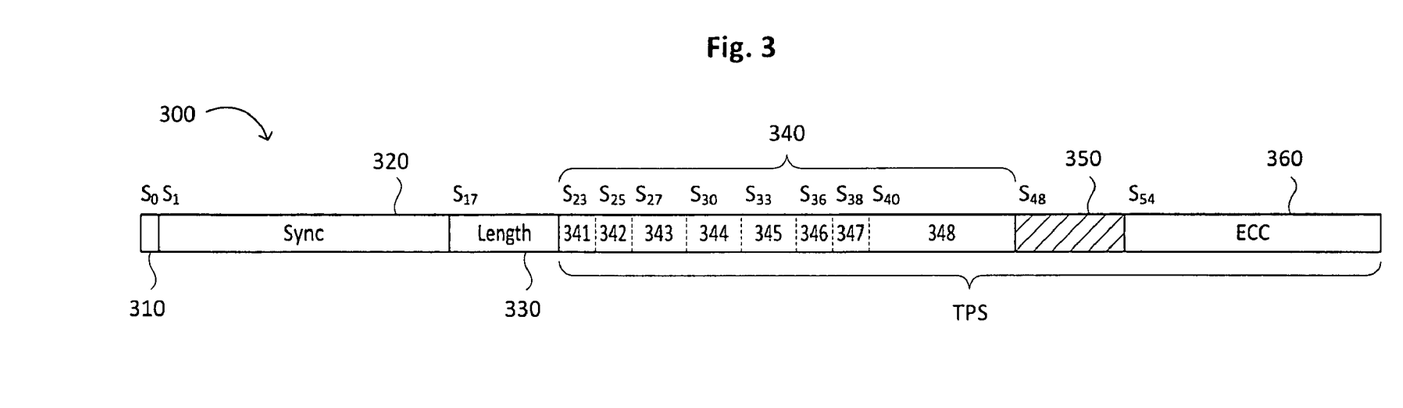
FIG. 3 is a diagram of the structure of a TPS block.

Referring now to FIG. 3, the structure of a fully decoded TPS data block is shown. The first segment 310 of the TPS data block (bit s0) is an initialization bit for a differential binary phase shift keying (2-PSK) modulation. The modulation of the TPS initialization bit is derived from a pseudorandom binary sequence. The second segment 320 of the TPS data block (bits $s_1$-$s_{16}$) is a synchronization word. The first and third TPS block in each super-frame (e.g., each group of four OFDM frames) have the synchronization word $s_1$-$s_{16}$=0011010111101110. The second and fourth TPS block have the synchronization word $s_1$-$s_{16}$=1100101000010001 (e.g., a binary complement of the synchronization words of the first and third TPS blocks). The next segment 330 of the TPS data block (bits $s_{17}$-$s_{22}$) is used as a TPS length indicator (binary count) to signal the number of used bits of the TPS. At present this length indicator has the value $s_{17}$-$s_{22}$=010111 if cell identification is not supported and the value $s_{17}$-$s_{22}$=011111 if the cell identification is supported.

Segments 340 (bits $s_{23}$-$s_{47}$) and 350 (bits $s_{48}$-$s_{53}$) generally comprise the usable transmission parameters. The bits in segment 340 currently defined, while segment 350 is reserved in the ETSI DVB-T/H standards for future use. Segment 360 of the TPS data block (bits $s_{54}$-$s_{67}$ comprises a Bose-Chaudhuri-Hocquenghem (BCH) error correction code (ECC).

Segment 341 (bits $s_{23}$-$s_{24}$) designates a frame number within an OFDM super-frame. Segment 342 (bits $s_{25}$-$s_{26}$) designate a constellation (e.g., QPSK, 16-QAM, or 64-QAM). Segment 343 (bits $s_{27}$-$s_{29}$) specify whether the transmission is hierarchical and, if so, the value of α. Segment 344 (bits $s_{30}$-$s_{32}$) specifies the code rate when non-hierarchical channel coding and modulation are used. When hierarchical channel coding and modulation are used segment 344 specifies the code rate for the high priority level of the modulation and segment 355 (bits $s_{33}$-$s_{35}$) specifies the code rate for the lower priority level of the modulation. Segment 346 (bits $s_{36}$-$s_{37}$) specifies the value of the guard interval, and segment 347 (bits $s_{38}$-$s_{39}$) specifies the transmission mode (e.g., 2K mode or 8K mode).

A conventional approach to decoding and demodulating the video stream is to first decode the TPS information before de-interleaving, de-mapping and decoding the received signals. One drawback of this approach that TPS information is distributed over an OFDM frame, where one frame contains 68 OFDM symbols. In the worst case (e.g., when reception begins after a frame has started, thereby requiring a second frame in order to completely decode and verify a block of TPS data), it may take up to 135 symbols to receive a complete OFDM frame. Thus, in some transmission modes, it may take more than 130 milliseconds to receive a complete frame, thereby delaying decoding and demodulation of the received video signal.

Therefore, it is desirable to provide a faster approach for decoding digital video signals with a reasonable degree of reliability. One solution to this problem involves applying an initial set of video transmission parameter values to one or more digital video signal processes, decoding video transmission parameter information from the digital video signal, and updating the initial set of video transmission parameter values with the decoded video transmission parameter information, as described in U.S. patent application Ser. No. 11/731,144, filed Mar. 30, 2007, the contents of which are incorporated herein by reference.

However, in order to decode the transmission parameter information from the digital video signal, the decoder must determine the position of the parameter information (e.g., to determine which bits in the transmission parameter signal correspond to segments 340 and/or 350 of FIG. 3). In a conventional approach to obtain the parameter information, a decoder first synchronizes to the synchronization word, decodes the TPS information, and then uses the TPS information de-interleaving, de-mapping and decoding the received signals. In order to get the position of the start of a frame, the synchronization words in TPS are often used.

Figure 4:
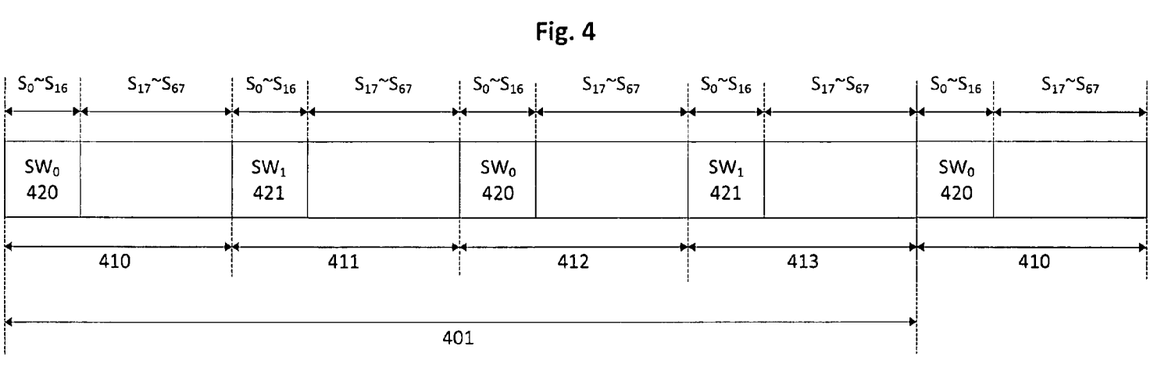
FIG. 4 is a diagram of the structure of a repeating sequence of TPS frames.

As shown in FIG. 4, there are generally two types of synchronization words which may be embedded in bits $s_0$-$s_{16}$ of each frame 410-413. The synchronization word $SW_0$ in frames 410 and 412 generally includes the bit values 0011010111101110, and the synchronization word $SW_1$ in frames 411 and 413 generally includes the complementary bit values 1100101000010001. It is possible that parameter values in each frame (e.g., in bits $s_{17}$-$s_{67}$) are identical to one or other of the synchronization words. In order to avoid matching to a false synchronization word, a conventional decoder may attempt to match at least two synchronization words of different types to determine the frame boundary.

One drawback of the conventional method is slow channel acquisition and scanning. In a worst case scenario, a decoder may need to receive 151 OFDM symbols (e.g., if the decoder begins receiving at bit $s_1$ of frame 410, then it will have to receive the symbol containing bit $s_{16}$ of frame 412, and all of the intervening symbols), in order to obtain two complete synchronization words. This may take more than 150 ms in some transmission modes. (e.g., in 8K mode with a guard interval equal to ⅛ of the useful period and an 8 Mhz transmission bandwidth). The duration may be even longer in some configurations (e.g., with guard interval equal to ¼ of the useful duration and a transmission bandwidth of 6 Mhz, the decoder may take approximately 225 ms to receive 151 OFDM symbols).

Therefore, it is also desirable to provide a faster approach for synchronizing with the frame boundaries of transmission parameter blocks to decode digital video signals.

SUMMARY

Embodiments of the present invention pertain to methods and systems for processing a digital video signal and acquisition of transmission parameters encoded therein. The parameters are generally encoded in a transmission parameter signal that includes a repeating sequence of transmission parameter blocks. Each of the transmission parameter blocks generally comprises a synchronization block and a data block. In one embodiment, a method of processing a digital video signal includes the steps of providing an initial set of parameters for decoding the digital video signal, finding a synchronization block position by matching bits of the transmission parameter signal to a predetermined pattern, obtaining raw transmission parameter bits from the transmission parameter signal based on the synchronization block position, storing the raw transmission parameter bits, and updating at least one of the initial set of parameters with at least one updated transmission parameter value from the raw transmission parameter bits.

The present methods may search for a synchronization match before a complete data block has been decoded from the transmission parameter signal and/or before two complete synchronization blocks and a complete data block (e.g., the data block between the two synchronization blocks) have been decoded from the transmission parameter signal.

In an exemplary embodiment, the matching step may include retrieving one or more earliest-received bits of the stored transmission parameter bits and one or more last-received bits of the stored transmission parameter bits, appending the earliest-received bits to the last-received bits to produce comparison bits, and comparing the comparison bits to the predetermined pattern. In a further embodiment, comparing the combined earliest-received and last-received bits may be performed when the number of bits received is equal to the frame size (e.g., the sum of the data block size and the synchronization word size). In some exemplary embodiments, the earliest received bits and/or the last-received bits may be modified prior to appending.

In some embodiments, the repeating sequence of transmission parameter blocks includes a synchronization block having a first pattern, followed by the first data block, followed by a synchronization block having a second pattern, followed by the second data block (e.g., which may be the same as or different from the first data block (e.g., the second data block may have a different sequence number. The pattern of the second synchronization block is a binary complement of the pattern of the first synchronization block. Thus, the synchronization matching step may include appending a binary complement of the earliest-received bits to the last-received bits to produce the comparison bits.

The sum of the number of earliest-received bits and the number of latest-received bits generally equals the size of the synchronization block to be searched for. Thus, the matching step may include testing multiple combinations of earliest-received bits and latest-received bits to determine whether any of the combinations matches the synchronization word.

In another exemplary embodiment, the method includes determining whether to update at least one of the initial set of parameters with at least one corresponding updated transmission parameter value from the raw transmission parameter bits based on a receiving quality indicator. The receiving quality indicator may comprise, for example a transmission signal lock indicator and/or an error-probability indicator An exemplary digital video receiver includes a demapper, one or more decoder blocks, a memory, and a transmission parameter processor. The demapper is configured to demodulate the digital video signal having a transmission parameter signal encoded therein. The decoder blocks are generally configured to decode the demodulated digital video signal. The memory is generally adapted to store an initial set of video transmission parameters, wherein the demapper and/or the decoder block(s) are configured to demap and/or decode the digital video signal and/or the demodulated video signal according to the initial set of video transmission parameters.

The transmission parameter processor is configured to store transmission parameter bits from the transmission parameter signal, match a sequence of the stored transmission parameter bits to a predetermined pattern (e.g., to a predetermined synchronization block pattern), determine one or more updated transmission parameter values from the stored transmission parameter bits based on a position of the matching sequence, and update at least one of the initial set of video transmission parameter values with a corresponding one of the updated transmission parameter values when corresponding updated transmission parameter value is different from the at least one initial parameter value.

The present embodiments advantageously provide a faster approach for synchronizing with the frame boundaries of transmission parameter blocks to decode digital video signals.

These and other advantages of the present invention will become readily apparent from the detailed description of embodiments below.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on code, data bits, data streams, or waveforms within a computer, processor, controller, and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "processing," "operating," "computing," "calculating," "determining," "manipulating," "transforming" or the like, refer to the action and processes of a computer or data processing system, or similar processing device (e.g., an electrical, optical, or quantum computing or processing device or circuit), that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data similarly represented as physical quantities within other components of the same or a different system or architecture.

Furthermore, in the context of this application, the terms "wire," "wiring," "line," "signal," "conductor" and "bus" refer to any known structure, construction, arrangement, technique, method and/or process for physically transferring a signal from one point in a circuit to another. Also, unless indicated otherwise from the context of its use herein, the terms "known," "fixed," "given," "certain," "predefined" and "predetermined" generally refer to a value, quantity, parameter, constraint, condition, state, process, procedure, method, practice, or combination thereof that is, in theory, variable, but is typically set in advance and is generally not varied thereafter when in use.

Similarly, for convenience and simplicity, the terms "clock," "time," "timing," "rate," "period" and "frequency" are, in general, interchangeable and may be used interchangeably herein, but are generally given their art-recognized meanings. Also, for convenience and simplicity, the terms "data," "data stream," "waveform" and "information" may be used interchangeably, as may the terms "connected to," "coupled with," "coupled to," and "in communication with," (which may refer to direct or indirect connections, couplings, or communications) but these terms are generally given their art-recognized meanings herein.

Embodiments of the present invention pertain to methods and systems for fast acquisition of a digital video signal having a transmission parameter signal encoded therein, wherein the transmission parameter signal comprises a repeating sequence of transmission parameter blocks and each of the transmission parameter blocks comprises a synchronization block and a data block. Embodiments of the present invention can advantageously demodulate and decode a digital video signal before transmission parameters embedded in the signal are completely decoded. Embodiments of the present invention can also advantageously determine and update transmission parameters in less time than conventional methods. Thus, the time to acquire and/or scan a digital video channel is improved. The invention, in its various aspects, will be explained in greater detail below with regard to exemplary embodiments.

An Exemplary Method of Recovering Transmission Parameters

In embodiments of the present invention, an initial assumption may be made as to correct transmission parameters to use to decode and demodulate the digital video signal. If the initial assumption is correct, a receiver can decode the signal earlier without a need to wait for transmission parameter information to be completely received and decoded. The initial set of video transmission parameter values may include, for example, values for an interleaving type, a hierarchy, a constellation, a code rate, a guard interval, a transmission mode, a frame number, and/or a cell identifier. The initial set of video transmission parameter values may comprise a previous set of video transmission parameter values (e.g., parameter values that have been previously recovered for the same channel, for a different channel on the same system, or any other channel likely to have parameters similar to the present channel).

In many digital video broadcast systems (e.g., in regions and/or countries that have adopted the ETSI DVB-T and/or DVB-H standards), one or more of the transmission parameters may be relatively fixed. Therefore, if the initial parameter values are selected carefully (e.g., based on region-specific pre-defined parameters and/or previously received parameters) there is a high likelihood that the initial parameters will be correct. However, even if the initial assumption is incorrect and the receiver cannot decode and/or demodulate the digital video stream earlier, the transmission parameters can be updated when reliable (e.g., fully decoded, demodulated, and error corrected) TPS information is available. In order to recover the actual transmission parameter bits from the signal, the synchronization word (e.g., $SW_0$ 420 and/or $SW_1$ of FIG. 4) must be located within the transmission parameter bits received.

Figure 5:
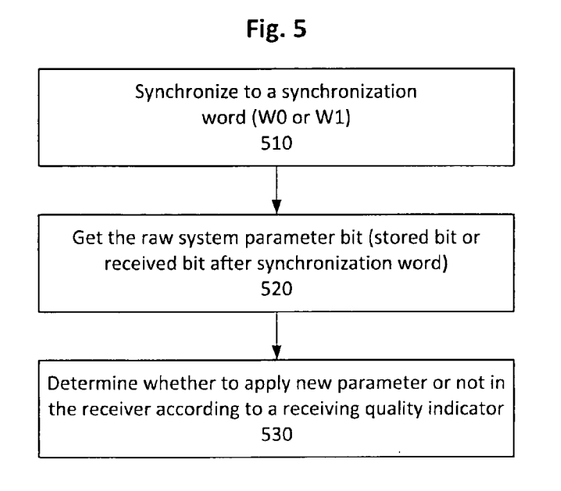
FIG. 5 is a flow diagram of an exemplary method of processing a digital video signal.

FIG. 5 shows a flow diagram 500 of an exemplary method of processing a digital video signal. Prior to obtaining the transmitted system parameter bits, the transmission parameter signal may be decoded according to an initial set of video transmission parameters Transmission parameter bits may then be demodulated and/or decoded from the transmission parameter signal and then stored. At step 510, a sequence of the stored transmission parameter bits (e.g., the most recently received transmission parameter bits) is compared to and matched with a predetermined pattern for a synchronization block (e.g., by finding the a start position of the synchronization block in order to obtain the raw transmission parameter bits).

At step 520, one or more updated transmission parameter values from the stored transmission parameter bits are determined based on a position of the matching sequence of the stored transmission parameter bits. At step 530, a receiving quality indicator (e.g., the bit error rate, transport stream (TS) lock indicator deriving from RS packet head [$B8_{HEX}$ and $47_{HEX}$], pre-viterbi probability, post-viterbi probability, and etc.) is evaluated to determine whether to apply one or more of the updated transmission parameter values in the receiver to update one or more initial transmission parameter values from the initial set of transmission parameter values. Thus, the initial set of parameters may be updated with the parameter values that are actually transmitted with the digital video signal (e.g., after a complete TPS block has been decoded from a received OFDM frame) as soon as a synchronization word is located and the position of the previously received bits can be determined with respect to the transmission parameter data format.

In a further embodiment, the video transmission parameter information comprises a plurality of transmission parameter signaling (TPS) bits. The plurality of transmission parameter signaling (TPS) bits may comprise positive synchronization bits and negative synchronization bits (e.g., synchronization segment 320 of TPS block 300, as described above and shown in FIG. 3), each one of the negative synchronization bits having a respective opposite positive synchronization bit.

The initial set of video transmission parameter values may be applied to the one or more digital video signal processes prior to correctly decoding the TPS bits (e.g., prior to decoding the TPS bits that are actually encoded in the carrier signal). Thus, the video decoder can "guess" the correct TPS values. If the initial values used are correct, then demodulation, de-interleaving, and decoding of the video signal can begin immediately, without waiting for a complete frame containing all of the transmitted TPS values to arrive.

In another embodiment, the initial set of video transmission parameter values may include values for an interleaving type, a hierarchy (e.g., a values designated in TPS data segment 343), a constellation (e.g., QPSK, 16-QAM, or 64-QAM, designated in TPS data segment 342), and/or a code rate (e.g., 1/2, 2/3, 3/4, etc., designated in TPS data segment 344). In yet another embodiment, the initial set of video transmission parameter values may include values for a guard interval (e.g., TPS data segment 346), a transmission mode (e.g., 2K mode or 8K mode, designated in TPS data segment 347), a frame number (e.g., TPS data segment 341), and/or a cell identifier (e.g., TPS data segment 348).

In another embodiment, the method further includes a step of receiving the digital video signal from a first channel, wherein the initial set of video transmission parameter values comprises a previous set of video transmission parameter values. The previous set of video transmission parameter values may include values from a previous digital video signal transmission on a different channel and/or values from a previous digital video signal transmission on the first channel. The initial and/or updated transmission parameters may advantageously be applied to steps of de-interleaving the digital video signal, demapping the de-interleaved digital video signal, and decoding the demapped digital video signal.

An Exemplary Method of Recovering Transmission Parameters with Partial Synchronization Words As shown in FIG. 4, a super frame generally includes a group of four OFDM frames. Each OFDM frame generally includes a transmission parameter block, where each of the transmission blocks comprises a synchronization block and a data block. The synchronization blocks generally have a size of NSB bits (e.g., including bits $s_0$-$s_{16}$ of synchronization word 420). The data block generally has a size of $N_{DB}$ bits. The first and third TPS blocks in each super-frame (e.g., in frames 410 and 412) have a first synchronization word $SW_0$. The second and fourth TPS blocks (e.g., in frames 411 and 413) have the synchronization block $SW_1$. The repeating sequence of transmission parameter blocks may comprises a synchronization block having a first pattern, followed by the first data block, followed by a synchronization block having a second pattern, followed by the second data block, wherein the second pattern comprises a binary complement of the first pattern. The first data block and the second data block maybe different from each other in some bits such as frame number and parity bits.

Figure 6:
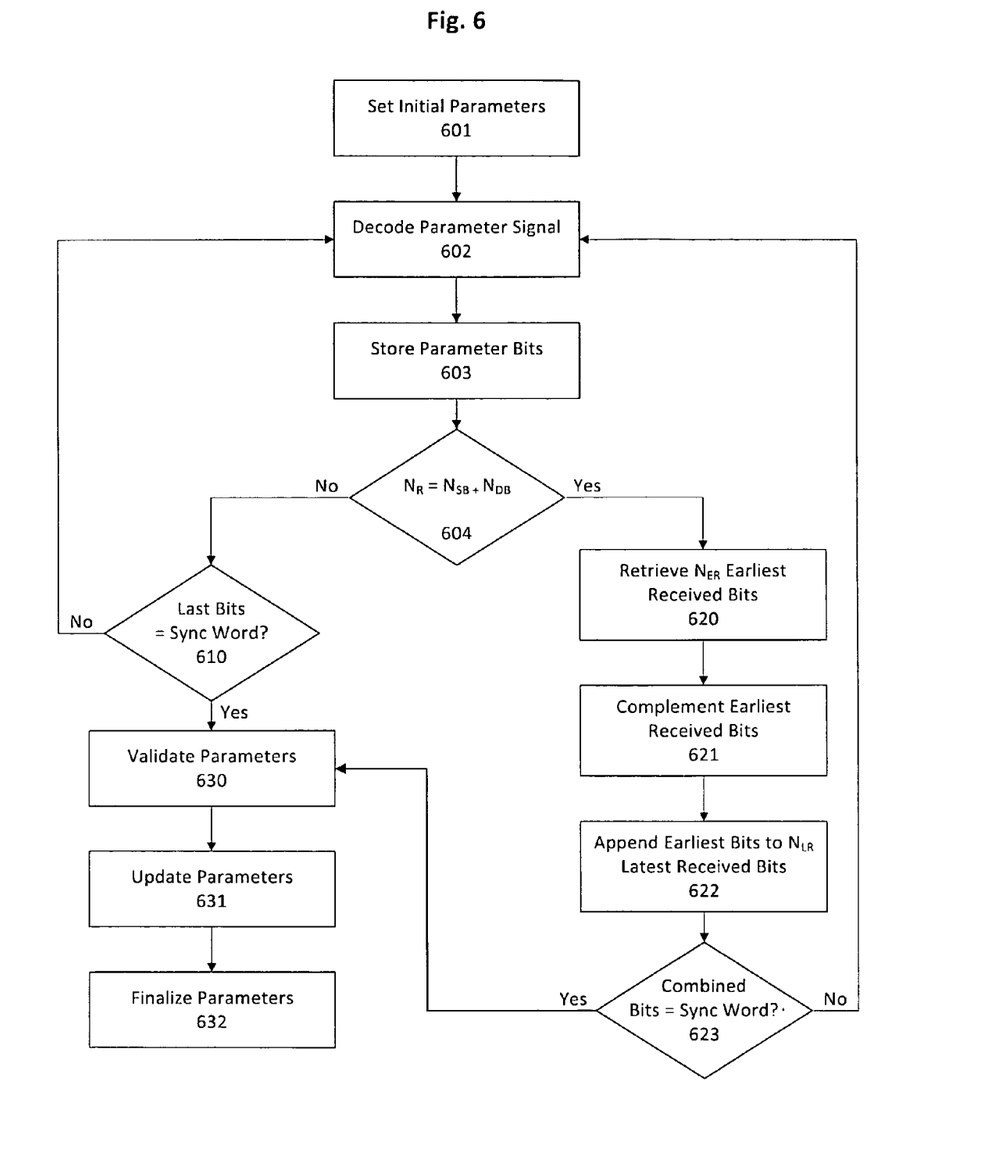
FIG. 6 is a flow diagram of an alternate exemplary method of processing a digital video signal.

FIG. 6 shows a flow diagram 600 of an alternate method of processing a digital video signal to recover transmission parameters. At step 601, an initial set of video transmission parameter values are applied to one or more digital video signal processes (e.g., to de-interleaving, de-mapping, and/or decoding processes). At step 602, transmission parameter information may be decoded and/or demodulated from the digital video signal to obtain raw parameter data (e.g., parameter data that has not been error corrected by a BCH decoder).

As shown in FIG. 3, a TPS block 300 according to the DVB-T/H standards includes a BCH error correction code (ECC) block 360. The ECC block is generally at the end of the TPS block. The ECC Block can be applied to detect or correct errors in the TPS block. In one embodiment, the ECC block may be compared to a reference block (as is known in the art) in order to detect transmission errors in the block. In other embodiments, the ECC block may be combined with other parts of the TPS block to form a BCH codeword and are feed into a BCH decoder in order to correct errors in the block. Thus, an entire TPS block (and the entire ODFM frame in which the TPS block is encoded) must be received from start to finish before the TPS data can be completely decoded and error-checked. However, according to this embodiment of the present invention, the raw (non-error-corrected) TPS bits may be used before the ECC is received, even if the reception of the digital video signal begins in the middle of a frame (e.g., as long as reception begins before bit s23, the raw transmission parameter bits encoded from bits $s_{23}$ to $S_{47}$ may still be usable).

Referring again to FIG. 6, at step 603 the raw transmission parameter bits are stored in a memory. At step 604, the method determines whether the number of received bits is equal to the total transmission parameter block size (e.g., whether $N_R$=NSB+NDB, where $N_R$ is the total number of bits received, $N_{SB}$ is the number of bits in the synchronization word, and $N_{DB}$ is the number of data bits in the transmission parameter data block).

If less than a full transmission parameter block has been received, then the method proceeds to step 610. At step 610 the most recently received bits are compared to the predetermined synchronization word parameters. If the bits do not match a synchronization word, then the method repeats steps 602 to decode more TPS bits from the incoming signal. If the bits do match, the method proceeds to step 630. At step 630, the parameters are validated (e.g., to determine whether the new parameters might be valid and/or improve might improve reception quality as compared to the initial set of parameters). At step 631, the parameters are updated based on the parameter validation at step 630. At step 632, the parameters are finalized. For example, step 632 may include completing a traditional alignment and error-correction process to obtain the final set of transmitted TPS data.

Figure 7A:
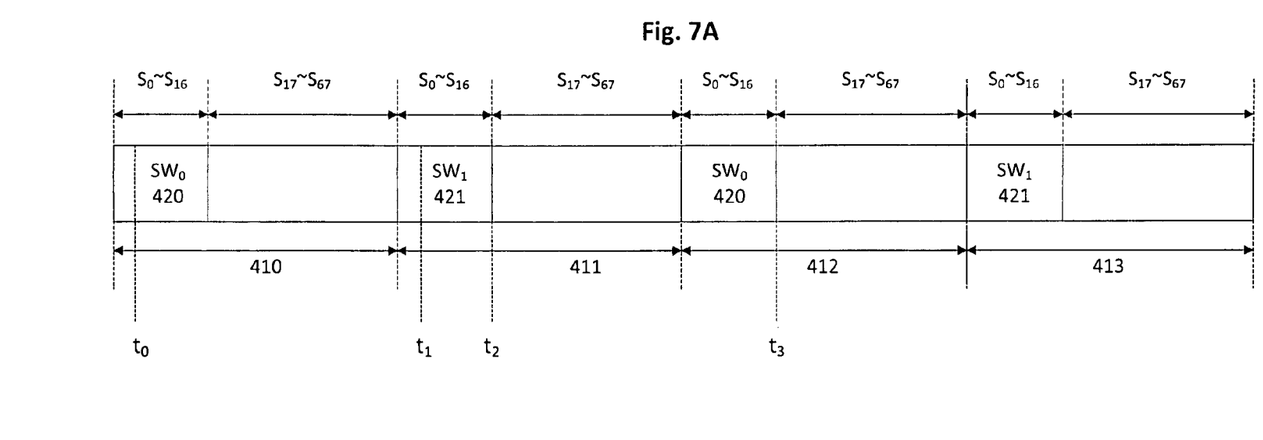
FIG. 7A is a diagram showing exemplary timeframes for receiving a repeating sequence of TPS blocks.

If a full transmission parameter block has been received at step 604, then it is possible that decoding began in the middle of a synchronization word (e.g., at time to in FIG. 7A), and the method proceeds to steps 620 to 623. FIG. 7A shows a diagram of exemplary timeframes for receiving a repeating sequence of TPS blocks. The data blocks generally correspond to similarly numbered blocks in FIG. 4. In a conventional method of synchronizing TPS blocks, two complete synchronization words generally must be received (e.g., both a first synch word such as $SW_0$ and the following complementary synch word such as $SW_1$). As a result, if the method begins receiving transmission parameters beginning at time $t_0$, then it may not be able to recover any transmission parameters until time $t_3$ (e.g., after complete synchronization words 421 and 420 are received).

Figure 7B:
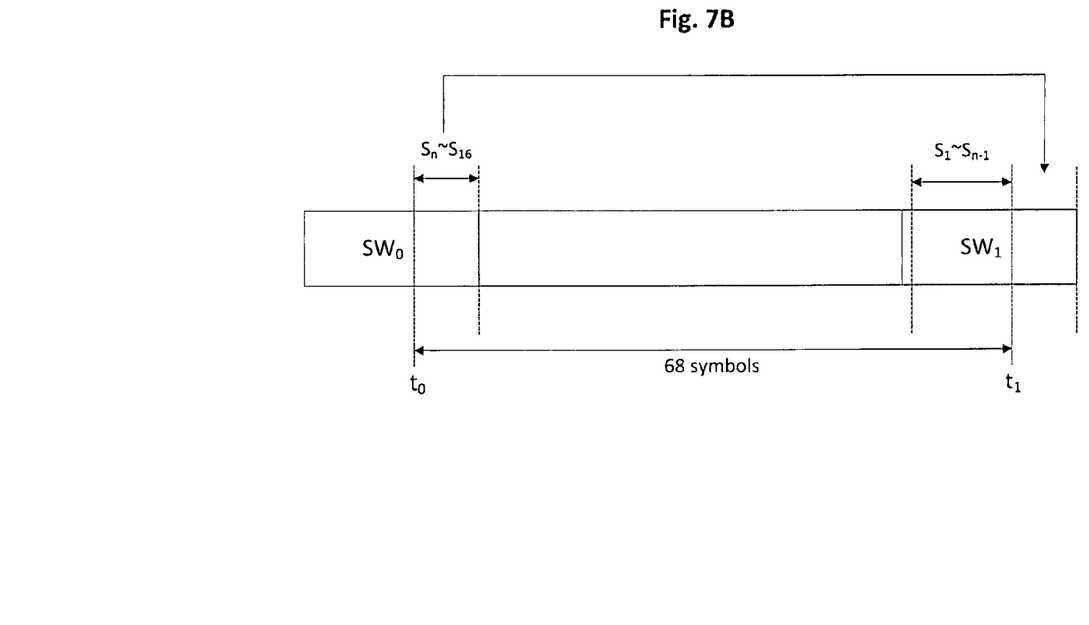
FIG. 7B is a diagram showing an exemplary operation on a TPS block according to an exemplary embodiment.

The present method may take advantage of the cyclic nature of the synchronization blocks in order to synchronize with the TPS data more quickly. Accordingly, referring again to FIG. 6, step 620 may include retrieving one or more earliest-received bits of the stored transmission parameter bits and one or more last-received bits of the stored transmission parameter bits (e.g., to obtain the total number of bits in a synchronization word). In implementations where alternating synchronization words are complementary, step 621 may include complementing the earliest received bits. At step 622, the earliest received bits are appended to the latest received bits. Thus, as shown in FIG. 7B, the earliest received bits may correspond to the last bits in the first synchronization word $SW_0$ when demodulation and raw bits decoding begins at time $t_0$. By appending the earliest received bits to the last received bits corresponding to the first bits in synchronization word $SW_0$, a complete synchronization word may be located. Accordingly, at step 623 the combined bits are compared to the predetermined synchronization word patterns. It will be recognized that steps 620 to 623 may be repeated for each combination of $N_{ER}$ and $N_{LR}$ bits that adds up to $N_{SB}$, where $N_{ER}$ is the number of earliest received bits, $N_{LR}$ is the number of last-received bits, and $N_{SB}$ is the number of bits in a synchronization word or block. If the combined bits match a synchronization pattern, the method proceeds to step 630 to 632 to make use of the transmission parameters.

The method may include updating the intermediate set of video transmission parameter values with the decoded and error-checked video transmission parameter information to provide a final set of video transmission parameter values. Thus, the method may further include steps of demodulating and/or decoding an ECC block (e.g., ECC block 360 in FIG. 3), comparing the decoded ECC block to a calculated ECC block, and/or checking for and/or correcting errors in the transmission parameter values using a BCH decoder which may make use of the ECC block. In a preferred embodiment, however, the digital video signal is decoded before all of the video transmission parameter information is decoded and error-checked and/or error-corrected. The video transmission parameter information may comprise a plurality of transmission parameter signaling (TPS) bits (e.g., data bits $s_{23}$-$s_{47}$ of TPS block 300). The initial set of video transmission parameter values may comprise values for an interleaving type, a hierarchy, a constellation, and/or a code rate.

In another embodiment, the initial set of video transmission parameter values consists of a previous set of video transmission parameter values. The previous set of video transmission parameter values may include values from a previous digital video signal transmission on a different channel and/or values from a previous digital video signal transmission on the first channel. As described above, in many digital video broadcast systems one or more of the transmission parameters may be relatively fixed. Therefore, initial parameter values that are based on previously received parameters (either for the same channel or a different channel) are likely to be correct.

In yet another embodiment, the digital video signal processes include de-interleaving the digital video signal, demapping the de-interleaved digital video signal, and/or decoding the demapped digital video signal.

An Exemplary Digital Video Receiver

Figure 8:
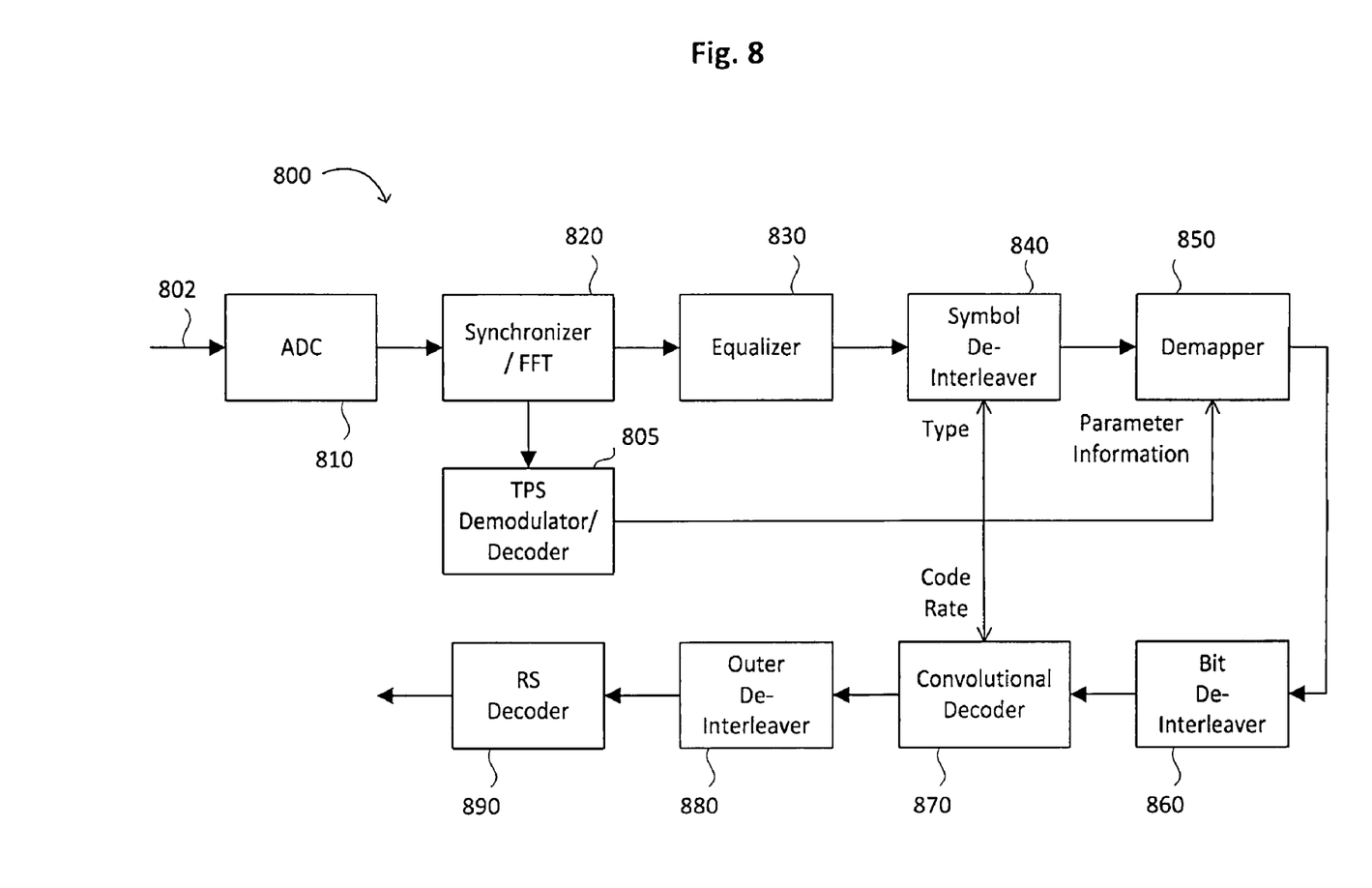
FIG. 8 is a functional block diagram of an exemplary embodiment of a digital video receiver.

FIG. 8 shows a functional block diagram of a digital video receiver according to the present invention. Analog-to-digital converter (ADC) 810 generally samples analog signal 802 (e.g., an analog broadcast carrier signal encoded and modulated according to a DVB standard) to produce a digital output. Synchronizer/FFT module 820 synchronizes the receiver to the incoming signal and extracts a subcarrier using a fast Fourier transform (FFT). Module 820 generally finds the boundary between a guard interval and a useful symbol interval in the received signal and performs FFT window timing synchronization in order to perform FFT with respect to only the useful symbols in the signal. The module may determine the start point of a symbol using a guard interval (e.g., a guard interval as designated in segment 346 of TPS block 300 in FIG. 3). The output of synchronizer 820 may be provided to both equalizer 830 for equalizing the output of synchronizer 820 and to TPS demodulator/decoder 805 to recover raw transmission parameter bits from the transmission parameter signal.

TPS demodulator/decoder 805 may include a transmission parameter processor configured to recover raw transmission parameter bits from the digital data signal generally as described with respect to FIGS. 5 and/or 6. TPS demodulator/decoder may then update the transmission parameters. For example, TPS demodulator/decoder 805 may provided an updated type parameter to symbol de-interleaver 840, updated mapping parameter information to demapper 850, an updated code rate parameter to convolutional decoder 870, etc.

The symbols in a DVB-T/H signal are interleaved to map v bit words onto the 1,512 (in 2K mode) or 6,048 (in 8K mode) active carriers per symbol, where v=2 for QPSK, v=4 for 16-QAM, and v=6 for 64-QAM. Therefore, according to the present invention, symbol de-interleaver 840 may be configured to receive initial transmission parameters and updated transmission parameters (e.g., from a memory), each of which may include signal type information such as the modulation type and transmission mode.

Demapper 850 generally recovers a digital bit sequence from a base band modulated sequence of complex symbols. In the DVB-T/H standards, the bits may be modulated using QPSK, 16-QAM, or 64-QAM. In addition, the modulation may be hierarchical, in which case the constellation ratio α must be known. Therefore, according to the present invention demapper 850 may be configured to receive initial and updated transmission parameters in order to demodulate and/or demap the baseband signal. In particular, demapper 850 may receive parameters relating to the constellation type (e.g., QPSK, 16-QAM, or 64-QAM as designated in segment 342 of TPS block 300 in FIG. 3) and/or hierarchy mode and α value (e.g., TPS segment 343).

Bit de-interleaver 860 reverses the bit-wise interleaving of the digital data stream as specified in the DVB-T/H standards. Convolutional decoder 870 reverses the convolutional encoding of the digital data stream. A digital data stream, under the DVB-T/H standards, may be encoded the data using a range of punctured convolutional codes, based on a mother convolutional code of rate 1/2 with 64 states, generally allowing selection of the most appropriate level of error correction for a given service or data rate in either non-hierarchical or hierarchical transmission mode. In addition to the mother code of rate 1/2, the system supports punctured code rates of 2/3, 3/4, 5/6 and 7/8. If two level hierarchical transmission is used, each of the two parallel channels may have its own independent code rate. Therefore, according to the present invention, convolutional decoder 870 may be configured to receive initial and updated transmission parameters in order to decode the digital data stream. In particular, convolutional decoder 670 may receive parameters relating to the code rate of one or both hierarchical channels (e.g., TPS blocks 344 and/or 345).

Outer de-interleaver 880 is generally configured to de-interleave the decoded digital video bitstream. In a DVB-T/H system, convolutional interleaving is generally used to rearrange the transmitted data sequence, such that it becomes more resilient with respect to long sequences of errors. Reed-Solomon (RS) decoder 890 is generally a block decoder configured to enable correction of errors in the decoded digital video bitstream and locking of the decoded digital video bitstream to a reference signal. RS decoder 890 is a type of BCH decoder. In a DVT-T/H system, the RS encoding is a non-binary block code, allowing the correction of up to a maximum of 8 bytes for each 188-byte packet.

While the above examples primarily include applications to digital video broadcasting, one skilled in the art will recognize that other signals (video, audio, data, and combinations thereof) may also be decoded in accordance with embodiments of the invention. Further, one skilled in the art will recognize that other variations of the decoding methods and hardware described herein may also be used in accordance with embodiments of the invention.

Conclusions

Thus, embodiments of the present invention include methods and systems for processing a digital video signal and acquisition of transmission parameters encoded therein. Embodiments of present invention advantageously provide a faster approach for synchronizing with the frame boundaries of transmission parameter blocks to decode digital video signals.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of processing a digital video signal having a transmission parameter signal encoded therein, wherein said transmission parameter signal comprises a repeating sequence of transmission parameter blocks and each of said transmission parameter blocks comprises a synchronization block and a data block, said method comprising:
- providing an initial set of parameters for decoding the digital video signal;
- finding a synchronization block position by matching bits of said transmission parameter signal to a predetermined pattern before a complete data block has been decoded from said transmission parameter signal;
- obtaining raw transmission parameter bits from said transmission parameter signal based on said synchronization block position using a decoder;
- storing said raw transmission parameter bits; and
- updating at least one of said initial set of parameters with at least one updated transmission parameter value from said raw transmission parameter bits.

2. The method of claim 1, further comprising determining said at least one updated transmission parameter value based on said synchronization block position.

3. The method of claim 1, further comprising decoding the digital video signal according to said at least one updated transmission parameter value.

4. The method of claim 1, comprising performing said matching before two complete synchronization blocks and one complete data block have been decoded from said transmission parameter signal.

5. The method of claim 1, wherein said matching comprises the steps of:
- retrieving one or more earliest-received bits of said stored transmission parameter bits;
- retrieving one or more last-received bits of said stored transmission parameter bits;
- appending said earliest-received bits to said last-received bits to produce comparison bits; and
- comparing said comparison bits to said predetermined pattern.

6. The method of claim 5, wherein said synchronization block has a size of $N_{SB}$ bits, said earliest-received bits comprise $N_{ER}$ bits, and said last-received bits comprise $N_{LR}$ bits, such that $N_{ER} + N_{LR} = N_{SB}$, where $N_{ER}$, $N_{LR}$, and $N_{SB}$ are each integers of at least one.

7. The method of claim 6, wherein said data block has a size of $N_{DB}$ bits and said steps of appending and comparing are performed when a total number of bits received ($N_R$) is equal to $N_{DB} + N_{SB}$, wherein $N_{DB}$ and $N_R$ are integers of at least one.

8. The method of claim 1, wherein said repeating sequence of transmission parameter blocks comprises a synchronization block having a first pattern, followed by said data block, followed by a synchronization block having a second pattern, followed by said data block, wherein said second pattern comprises a binary complement of said first pattern.

9. The method of claim 8, wherein said matching comprises the steps of:
- retrieving one or more earliest-received bits of said stored transmission parameter bits;
- retrieving one or more last-received bits of said stored transmission parameter bits;
- appending a binary complement of said earliest-received bits to said last-received bits to produce comparison bits; and
- comparing said comparison bits to said first pattern and said second pattern.

10. The method of claim 1, wherein said initial set of video transmission parameter values comprises values for an interleaving type, a hierarchy, a constellation, and/or a code rate.

11. The method of claim 1, wherein said initial set of video transmission parameter values comprises values for at least one of a guard interval, and a transmission mode.

12. The method of claim 1, further comprising receiving the digital video signal from a first channel, wherein said initial set of video transmission parameter values comprises a previous set of video transmission parameter values.

13. The method of claim 1, wherein said digital video signal processes include de-interleaving said digital video signal, demapping the de-interleaved digital video signal, and decoding the demapped digital video signal.

14. The method of claim 1, further comprising decoding and error-checking or correcting the video transmission parameter information by using a BCH decoder.

15. The method of claim 14, further comprising decoding the digital video signal before all of the video transmission parameter information is decoded and error-checked or corrected by the BCH decoder.

16. A method of processing a digital video signal having a transmission parameter signal encoded therein, wherein said transmission parameter signal comprises a repeating sequence of transmission parameter blocks and each of said transmission parameter blocks comprises a synchronization block and a data block, said method comprising:
- providing an initial set of parameters for decoding the digital video signal;
- finding a synchronization block position by matching bits of said transmission parameter signal to a predetermined pattern;
- obtaining raw transmission parameter bits from said transmission parameter signal based on said synchronization block position;
- storing said raw transmission parameter bits;
- determining whether to update at least one of said initial set of parameters with at least one corresponding updated transmission parameter value from said raw transmission parameter bits based on a receiving quality indicator.

17. The method of claim 16, wherein said receiving quality indicator comprises at least one of a transmission signal lock indicator and an error-probability indicator.

18. A digital video receiver, comprising:
- a demapper configured to demodulate a digital video signal having a transmission parameter signal encoded therein, wherein said transmission parameter signal comprises a repeating sequence of transmission parameter blocks and each of said transmission parameter blocks comprises a synchronization block and a data block;
- one or more decoder blocks configured to decode the demodulated digital video signal;
- a memory adapted to store an initial set of video transmission parameters, wherein the demapper and/or the decoder block(s) are configured to demap and/or decode the digital video signal and/or the demodulated video signal according to the initial set of video transmission parameters; and
- a transmission parameter processor configured to:
  - store transmission parameter bits from said transmission parameter signal;
  - match a sequence of said stored transmission parameter bits to a predetermined pattern;
  - determine one or more updated transmission parameter values from said stored transmission parameter bits based on a position of said matching sequence; and
  - update at least one of said initial set of video transmission parameter values with a corresponding one of said updated transmission parameter values when corresponding updated transmission parameter value is different from said at least one initial parameter value.

19. The digital video receiver of claim 18, wherein said memory comprises a register configured to (i) provide said initial set of video transmission parameter values to said demapper and/or decoder block(s) and (ii) receive and store said updated transmission parameter values.

20. The digital video receiver of claim 18, wherein said transmission parameter processor is configured to perform said match operation before a complete data block has been decoded from said transmission parameter signal.

21. The digital video receiver of claim 18, wherein said transmission parameter processor is configured to perform said match operation before two complete synchronization blocks and one complete data block have been decoded from said transmission parameter signal.

22. The digital video receiver of claim 18, further comprising:
- a first storage element configured to store one or more earliest-received bits of said stored transmission parameter bits; and
- a second storage element configured to store one or more last-received bits of said stored transmission parameter bits;
- wherein said transmission parameter processor is further configured to append said earliest-received bits to said last-received bits to produce comparison bits and to compare said comparison bits to said predetermined pattern.

23. The digital video receiver of claim 22, wherein said synchronization block has a size of $N_{SB}$ bits, said earliest-received bits comprise $N_{ER}$ bits, and said last-received bits comprise $N_{LR}$ bits, such that $N_{ER} + N_{LR} = N_{SB}$, where $N_{ER}$, $N_{LR}$, and $N_{SB}$ are each integers of at least one.

24. The digital video receiver of claim 23, wherein said data block has a size of $N_{DB}$ bits and said transmission parameter processor is configured to perform said append and compare operations when a total number of bits received ($N_R$) is equal to $N_{DB} + N_{SB}$, wherein $N_{DB}$ and $N_R$ are integers of at least one.

25. The digital video receiver of claim 18, wherein said repeating sequence of transmission parameter blocks comprises a synchronization block having a first pattern, followed by a first data block, followed by a synchronization block having a second pattern, followed a second data block, wherein said second pattern comprises a binary complement of said first pattern.

26. The digital video receiver of claim 25, further comprising:
- a first storage element configured to store one or more earliest-received bits of said stored transmission parameter bits; and
- a second storage element configured to store one or more last-received bits of said stored transmission parameter bits;
- wherein said transmission parameter processor is further configured to append a binary complement of said earliest-received bits to said last-received bits to produce comparison bits and to compare said comparison bits to said first pattern and said second pattern.

* * * * *